Figures 1, 2:
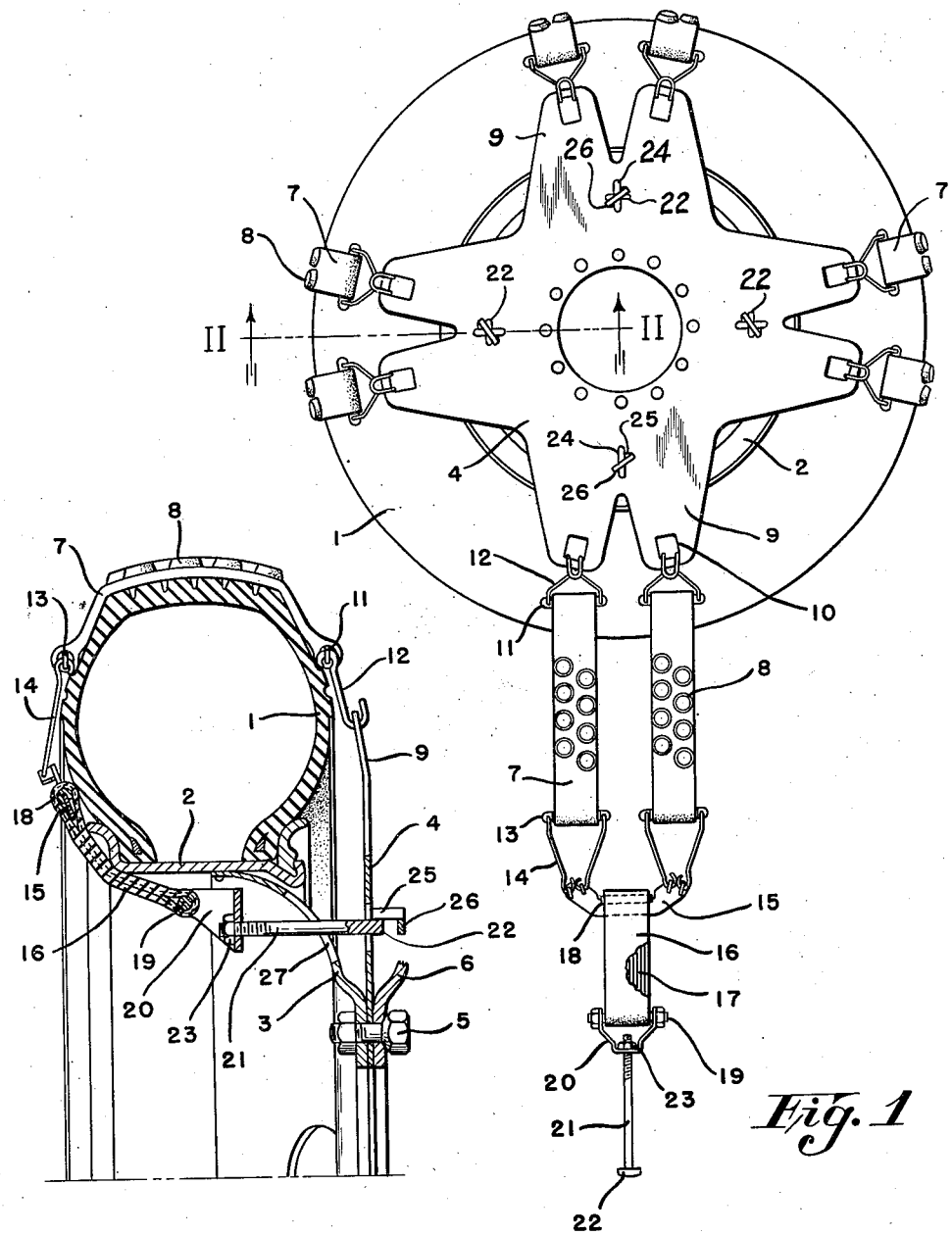

April 12, 1949.  E. EGER  2,467,017

ANTISKID CHAIN

Filed Aug. 30, 1946

INVENTOR
ERNST EGER
BY
Charles C. Willson
ATTORNEY

Patented Apr. 12, 1949

2,467,017

UNITED STATES PATENT OFFICE 2,467,017

ANTISKID CHAIN

Ernst Eger, Los Angeles, Calif., assignor to United States Rubber Company, New York, N. Y., a corporation of New Jersey Application August 30, 1946, Serial No. 693,835

4 Claims. (Cl. 152—221)

1

This invention relates to anti-skid chains and more particularly to an anti-skid chain assembly adaptable for quick application to tire and wheel units.

Various types of anti-skid chains have been proposed heretofore, and they have been more or less effective in reducing skidding of motor vehicles. The principal objection to the anti-skid chains available heretofore is the difficulty of assembling and removing such chains from wheels. When it is decided to apply such chains this frequently needs to be done in bad weather while working in mud or snow, which greatly increases the difficulty of securing an anti-skid chain in place about a wheel or tire.

I have provided a novel combination whereby anti-skid chains may be easily and quickly applied to a tire and wheel unit, the present construction however has been designed primarily for use upon the outer tire and wheel assembly of a dual wheel construction such as used on buses and trucks.

The invention consists generally of a spider type plate attached to a wheel or preferably between the inner and outer wheels of a dual wheel construction and having openings in its outer peripheral portions for the reception of hooks to which one end of each anti-skid member or strap may be attached. Each anti-skid strap is positioned transversely over the tread of the tire and its opposite ends through suitable linkage are connected to the spider type plate by means of a quick attaching clamping bolt. The construction is such that both ends of an anti-skid strap are anchored to the spider plate.

It is therefore among the objects of my invention to provide anti-skid chains which may be easily and quickly attached to or disengaged from a tire and wheel unit; to provide an attachment to a wheel for use in anchoring skid chains which attachment will not interfere with the normal operation of the tire; to provide an anti-skid device which may be applied about a tire in a plurality of units rather than a skid chain which extends completely around the circumference of the tire; to provide a skid chain which is easily secured tightly around the cross section of the tire; and to provide a skid chain of the character described which is economical to manufacture.

These and other objects and advantages will appear more fully in the following detailed description, when considered in connection with the accompanying drawing in which:

Fig. 1 is a side elevational view of an anti-skid chain of my invention shown applied to the inner face of the outer wheel of a dual pneumatic tire and wheel assembly; and Fig. 2 is a transverse view, in section, taken along lines II—II of Fig. 1.

With reference to the drawing, I show an embodiment of my invention associated with a tire 1 and rim 2, of an outer wheel 3 of a conventional dual wheel construction. Associated with the inner face of the wheel 3 is a spider type plate 4 attached to the wheel 3 by means of bolts 5. As illustrated in the drawing the wheel assembly 3 being one of a dual wheel assembly, the bolts 5 serve to attach the wheel 3 to an inner wheel 6. It is to be understood, however, that the spider plate 4 may be used in assemblies other than in dual wheel constructions. In the dual wheel assembly the plate 4 may be easily installed between the two wheels 3 and 6 and when it is so positioned the spider plate 4 remains in such position as a fixed part of the assembly.

In the present invention, the anti-skid device or chain constitutes a plurality of separate units, each unit comprising a pair of anti-skid straps 7. These straps are formed of rubber or synthetic rubber in combination with a cord fabric as a reinforcing element. Mounted onto the tread portion of the anti-skid straps 7 are a plurality of non-skid elements or buttons 8. Also, each end of the strap is provided with an eye for the purpose of attachment to connecting links. For a more complete disclosure on an anti-skid strap of this character, reference may be had to my Patent No. 2,099,006 granted November 16, 1937.

The spider plate 4 includes a plurality of arms 9 extended substantially radially from the hub. An opening 10 is formed near the end portion of each of the arms 9.

At one end of the strap 7 and extending through the eye thereof is a bar 11 to which is attached a hook 12. This hook is adaptable for engagement with one of the openings 10 formed in the arms of the spider 4.

At the opposite end of the strap 7 and extending through the eye thereof is a bar 13 to which is attached a pair of links 14. Two of the straps 7 constitute a pair to form a unit strap assembly. Consequently the two links 14 engage a common plate or yoke 15 which in turn is attached to a flexible member 16. This member 16 may be in the form of a leather or fabric belt or it may be formed in substantially the same manner as the straps 7, that is, it may be formed of a rubber or synthetic rubber composition in combination with strain resistance elements such as cord fabric 17. The member 16 has an eye at each end thereof for the purpose of receiving attaching means. Interposed between the plate 15 and the member 16 is a radius plate or guard 18 adapted to provide a rounded engaging surface so as to prevent any cutting action between the plate 15 and the member 16.

At the opposite end of the member 16 and extending through the eye thereof is a bolt 19 attached to a bracket 20. A special bolt 21 having a head 22 is adapted for association with the spider plate 4, and a nut 23 permits the anti-skid assembly to be tightened in place as it extends transversely about the tire. The bolt head 22 is elongated and has flat sides. A slot 24 formed in the spider plate 4 permits the bolt head 22 to be introduced therethrough, and upon a 90° turning movement of the bolt, it may be securely attached to the plate 4. In order to facilitate proper securing of the bolt head 22 with the plate 4 a pair of bars 25 are welded to the plate 4 adjacent to the slot 24 in such a manner as to restrain turning movement of the bolt 21 when the nut 23 is tightened with the usual socket wrench. A plate 26 is welded to the ends of the bars 25 in order to join these bars together. This plate 26 serves the purpose of reinforcing the bars 25 and at the same time the plate prevents the bolt 21 from extending too far through the slot 24 during the initial insertion of the head 22 through the slot 24.

As shown in Fig. 2, the wheel 3 which is of conventional design, usually is provided with a plurality of openings 27, and it is through these openings that the bolt 21 extends when it is secured in assembly relation with the plate 4.

In the operation of the present invention the plate 4 is clamped in place between the dual wheels 3 and 6. This plate becomes a fixed part of the wheel assembly and the plate may remain in this position throughout the normal operation of the vehicle. When it is desired to apply the anti-skid straps it is merely necessary to reach over the tire and insert the hooks 12 into the opening 10 of the spider 4. The opposite end of the anti-skid strap assembly includes the bolt 21, the head of which is inserted through the opening 27 in the wheel 3 and through the slot 24 of the plate 4. By turning the bolt 21 90° its elongated head will engage the bars 25 so as to restrict further turning movement. Thereafter, it is merely necessary to tighten the nut 23 so as to secure the anti-skid strap in tight engagement transversely around the tire. The connecting links 12 and 14 allow the proper flexing and positioning of the strap 7, and the members 16 form a flexible connection between the links 14 and the bracket 20 which supports the bolt 21.

As thus shown and described, it is believed apparent that I have provided a novel anti-skid strap combination which may be easily and quickly applied or removed from a tire and wheel assembly. While I have shown a preferred embodiment of my invention, it is to be understood that it is susceptible of those modifications which appear obviously within the spirit of the invention and as appearing in the scope of the appended claims.

Having thus described my invention, what I claim and desire to protect by Letters Patent is:

1. In combination with a tire and wheel assembly for motor vehicles, an anti-skid device comprising, a plate attached to a wheel so that it encircles the wheel axle, an anti-skid member adapted to extend transversely over the perimeter of the tread portion of the tire, a connecting hook for securing one end of the anti-skid member with the plate, a bolt connector for anchoring the other end of the anti-skid member to the plate and adapted to extend through the wheel into engagement with the plate, a transversely elongated head on the bolt, said plate having an elongated slot therein for the reception of the bolt head, and means for restraining turning movement of the bolt head beyond a position transversely of the elongated slot.

2. In combination with a tire and wheel assembly for motor vehicles, an anti-skid device comprising, a plate attached to a wheel, arms extending from the plate and positioned in spaced relation with the sidewall of the tire and extending substantially to the center of the sidewall of the tire, an anti-skid member having a pair of anti-skid straps adapted to extend transversely over the perimeter of the tread portion of the tire, a connecting hook joining one end of each strap to an arm of the plate, and means connecting the opposite end of each strap with the plate, said means comprising a connecting link, a flexible strap, a bracket secured to the strap, and a bolt adapted to extend through the wheel and fasten the bracket with said plate.

3. In combination with a tire and wheel assembly, an anti-skid device comprising, a plate attached to a wheel, an arm extending from the plate and positioned in spaced relation with the sidewall of the tire and extending substantially to the center of the sidewall of the tire, an anti-skid member adapted to extend transversely over the perimeter of the tread portion of the tire, a connecting hook joining the anti-skid member with said arm, a bolt, means connecting the opposite end of the anti-skid member with the bolt, a transversely elongated head on the bolt, said plate having an elongated slot therein for the reception of the bolt head, and means for restraining turning movement of the bolt head beyond a position transversely of the elongated slot.

4. In combination with a wheel assembly for a motor vehicle provided with dual pneumatic tires, a metal wheel for each of the dual tires, and each wheel having an off-set annular flange adapted to receive clamping bolts, a plate adapted to encircle the wheel axle between these wheel flanges and to be clamped between these flanges of the two wheels so that it lies between the dual tires, an anti-skid member adapted to extend transversely over the perimeter of the tread portion of one tire, a connecting hook joining one end of the anti-skid member to the plate, and means for connecting the opposite end of the anti-skid member to the plate comprising an adjustable anchor adapted to extend through the wheel into engagement with said plate.

ERNST EGER.

REFERENCES CITED

The following references are of record in the file of this patent:

UNITED STATES PATENTS

| Number | Name | Date |
| --- | --- | --- |
| 1,041,139 | Miller | Oct. 15, 1912 |
| 1,565,095 | Jeup | Dec. 8, 1928 |
| 2,224,879 | Nagle et al. | Dec. 17, 1940 |